United States Patent

Allen

[15] 3,668,655

[45] June 6, 1972

[54] WRITE ONCE/READ ONLY SEMICONDUCTOR MEMORY ARRAY

[72] Inventor: Charles A. Allen, Poughkeepsie, N.Y.

[73] Assignee: Cogar Corporation, Wappingers Falls, N.Y.

[22] Filed: Mar. 26, 1970

[21] Appl. No.: 23,234

[52] U.S. Cl. ..........................................340/173 SP, 307/202

[51] Int. Cl. ..........................................................G06f 13/00

[58] Field of Search...........340/173 R, 173, 173 FF, 173 NR; 307/238, 202, 246, 318

[56] References Cited

UNITED STATES PATENTS

| | | | |
|---|---|---|---|
| 3,489,927 | 1/1970 | Kelley, Jr. et al. | 307/202 X |
| 3,245,051 | 4/1966 | Robb | 340/173 |

FOREIGN PATENTS OR APPLICATIONS

| | | | |
|---|---|---|---|
| 1,131,210 | 10/1968 | Great Britain | 340/173 |

OTHER PUBLICATIONS

Akmenkalns, " Control Circuit," IBM Technical Disclosure Bulletin, Vol. 3, No. 5, Oct. 1960, p. 42.

*Primary Examiner*—Maynard R. Wilbur
*Assistant Examiner*—Leo H. Boudreau
*Attorney*—Harry M. Weiss

[57] ABSTRACT

This disclosure relates to a write once/read only semiconductor memory array which utilizes a single voltage (above the memory cell breakdown voltage) on a word drive line to effect writing into any selected memory cell of the array. Each memory cell of the array is preferably provided with a protective diode connected in parallel to the cell to prevent breakdown of unselected memory cells.

2 Claims, 7 Drawing Figures

FIG. I
PRIOR ART
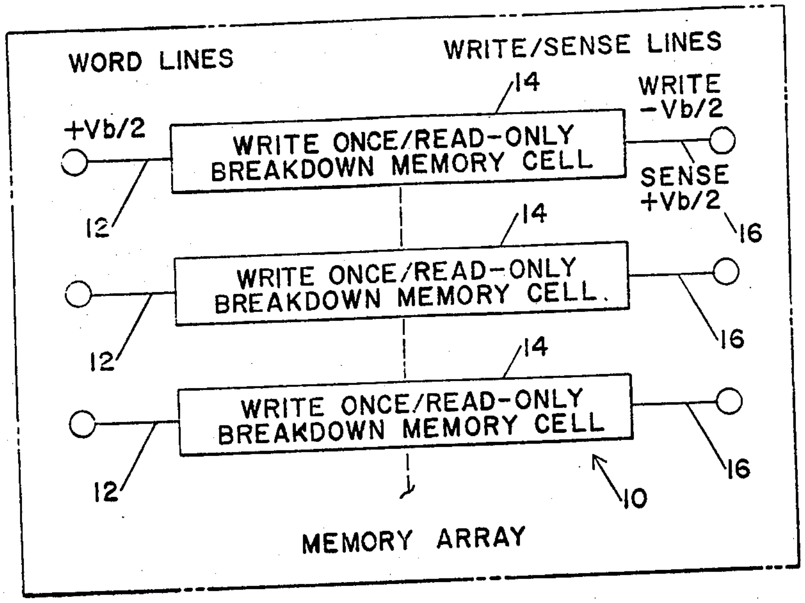
FIG. 2
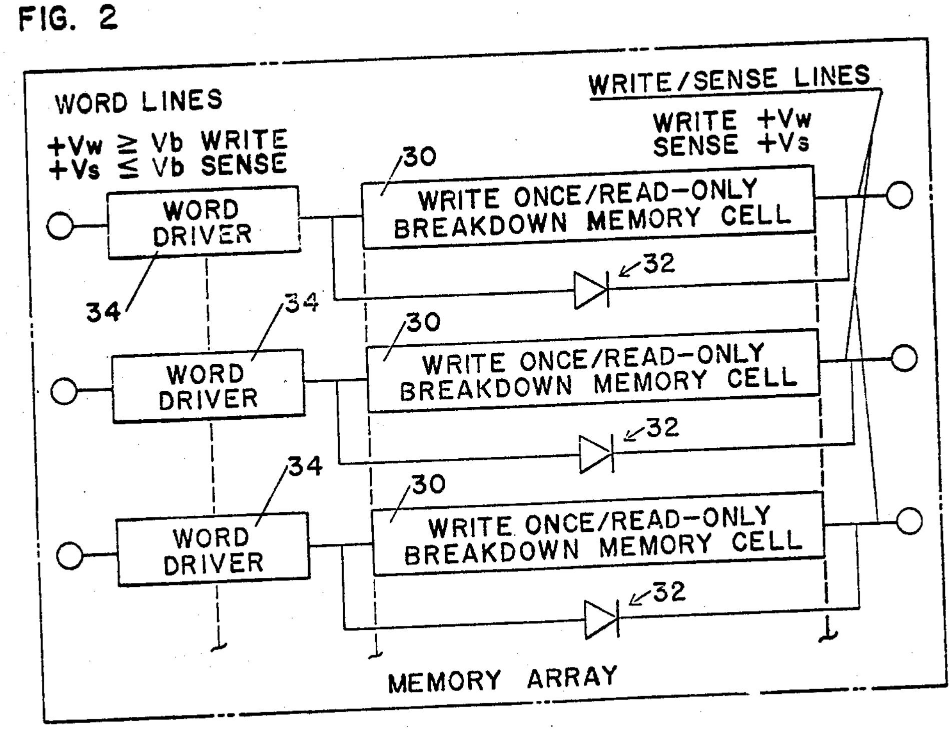
INVENTOR
CHARLES A. ALLEN
BY Harry M Weiss
ATTORNEY

WRITE ONCE/READ ONLY SEMICONDUCTOR MEMORY ARRAY

BACKGROUND OF THE INVENTION

1. Field of the Invention

This invention relates generally to memory arrays and more particularly, to semiconductor memory arrays of the write-once, read-only type which has protection means for the semiconductor memory cells thereof to prevent accidental writing or breakdown of unselected memory cells.

2. Description of the Prior Art

One type of write-once, read-only memory array to which this invention pertains is disclosed in the patent entitled "-Semiconductor Device, Method and Memory Array," inventors M. S. Hess and W. F. Krolikowski, filed Apr. 14, 1969, Ser. No. 815,971 U.S. Pat. No. 3,576,549 and assigned to the same assignee of this invention. The operation of the memory cell disclosed in the above identified patent requires at least half of the breakdown voltage to be applied to one end of the memory cell (word drive line) and the simultaneous application of at least half of the breakdown voltage (of opposite polarity) to be applied to the other end of the memory cell (bit line) to achieve breakdown of the cell. In order to avoid breakdown of an unselected memory cell during writing or reading operations which could occur when half the breakdown voltage is applied to each cell and the semiconductor memory cell device has an insulator coating that is thinner than designed, a protective arrangement was required to prevent accidental breakdown or writing into an unselected memory cell regardless of the thickness of the insulator.

Similarly, in other types of write-once, read-only memory arrays which do not use the insulator breakdown principle, but rely on device electrical breakdown effects such as described in Electronics, Aug. 18, 1969, pages 195–196, voltage pulses of equal and opposite polarity are applied to opposite ends of a memory cell to write a "1" or "0" therein. As in the write-once, read-only memory array described in the above identified patent, half the voltage pulse applied during the writing operation or even the voltage pulse used for reading would cause undesired device breakdown for those semiconductor (diode) devices of the memory array that cannot, because of structural or process variation, resist breakdown for voltages applied to the device that are below the normal total coincident writing voltage. Accordingly, a protective arrangement is also necessary to protect cells of the type of write-once, read-only memory array described in the Electronics publication.

Furthermore, it was desirable to provide a write-once, read only memory array that utilized a single voltage pulse of one polarity applied to only one end of each cell that was to be written into. This type of writing operation, which avoids the use of coincident voltage pulses, permits the utilization of a single breakdown voltage pulse which need not be confined to a precise value as long as the single breakdown voltage pulse is above the minimum value necessary to achieve device breakdown. Since the voltages applied to selected and unselected memory cells can be a ratio factor of five to one, for example, a single breakdown voltage pulse writing operation is very advantageous over the coincident writing pulse technique. The five factor difference in voltage pulses applied to selected versus unselected memory cells permits a greater degree of safety in avoiding accidental writing into unselected cells.

SUMMARY OF THE INVENTION

Therefore, it an object of this invention to provide an improved memory array.

It is a further object of this invention to provide an improved semiconductor memory array.

It is a still further object of this invention to provide an improved write-once, read-only semiconductor memory array.

It is a still further object of this invention to provide a protection arrangement for preventing accidental writing in a write-once, read-only memory array.

DESCRIPTION OF THE PREFERRED EMBODIMENTS

In accordance with one embodiment of this invention, a memory array is provided which comprises a plurality of semiconductor memory cells that are interconnected to provide a memory array. Each of the cells has a first electrical state prior to receiving a writing signal and an irreversible different second electrical state after receiving a writing signal. Writing means are electrically connected to the cells of the memory array for applying a write signal to only one end of a selected memory cell and placing the selected memory cell in the second electrical state. Reading means are provided for sensing the information contained in the memory array.

The writing means comprises word driver means which include a transistor and a resistor connected to the collector of the transistor. The resistor is connectable to a first voltage source whose value is sufficient to place the selected memory cell in the second electrical state. The base of the transistor is connectable to a second voltage source capable of turning on the word driver transistor, and the emitter of the transistor is connected to ground. The one end of the selected memory cell that is connected to the word driver means is connected between the resistor and the collector of the word driver transistor.

The memory array further includes protection means for preventing unselected memory cells from being accidentally placed into the second electrical state during, for example, a writing operation on an adjacent cell. The protection means is a diode connected in parallel to each memory cell.

The foregoing and other objects, features and advantages of the invention will be apparent from the following more particular description of the preferred embodiments of the invention, as illustrated in the accompanying drawings.

BRIEF DESCRIPTION OF THE FIGURES

FIG. 1 is a schematic representation, in substantially block diagram form, of the prior art write once/read only breakdown type of memory array.

FIG. 2 is a schematic representation, in substantially block diagram form, of a write once/read only breakdown type of memory array in accordance with this invention.

Referring to FIG. 1, a prior art write once/read only breakdown type of memory array 10 is shown in substantially block diagram form. The array 10 comprises word lines 12 electrically connected to write once/read only memory cells 14. This figure is representative of both types of prior art write once/read only memory arrays as discussed above.

Writing into a memory cell 14 of the memory array 10 of FIGS. 1 or 3 is achieved by applying a voltage pulse having at least the value of $+Vb/2$ on the word line which is connected to one end of the memory cell 14 while simultaneously applying a $-Vb/2$ pulse on write/sense line 16 which is electrically connected to the other end of the memory cell 14. Reading is accomplished by applying and sensing a $+Vb/2$ voltage pulse on the write/sense lines 16. $Vb$ is the breakdown voltage amount needed to change the memory cell from a non-conducting first state to a conducting second state. In FIG. 3, which is a more detailed showing of the breakdown type of memory cell and array disclosed in the above identified patent, only a single memory cell, for purposes of illustration, is shown as generally indicated by numeral 14. The memory cell 14 is composed of a resistor 18 and a diode 20 shown in dotted box 22. The PN diode 20 is shown in more detail in FIGS. 3A and 3B which are elevational, cross-sectional views of the memory cell 14. The resistor of the memory cell 14 is shown as the thin insulator region 18 in FIG. 3A. FIG. 3A is the memory cell 14 before breakdown of the insulator 18 and FIG. 3B is the memory cell 14 after breakdown of the insulator 18. In FIGS. 3A and 3B, P region 22 is a planar region formed within N region 24 which together form the diode 20. The N region 24 is provided with an electrical contact 26 and a conductive land 28 is shown in FIG. 3A over the P region 22. In FIG. 3B, breakdown of the insulator 18, by means of a coincident voltage writing operation, permits the land 28 to make electrical contact to the P region 22. FIG. 3C is an electrical schematic representation of memory cell 14A after a write operation which makes the cell identical to a single conducting diode. The memory cell 14 in FIG. 3 is substantially non-conducting due to the high resistance of the resistor (insulator) 18. Similarly, the memory cell described in the above identified Electronics article has a non-conducting first state due to the existence of two back-to-back diodes and a conducting second state, after device or cell breakdown, due to the short circuitry of one of the two back-to-back diodes leaving a single conducting diode.

DESCRIPTION OF THE INVENTION

Figure 3:
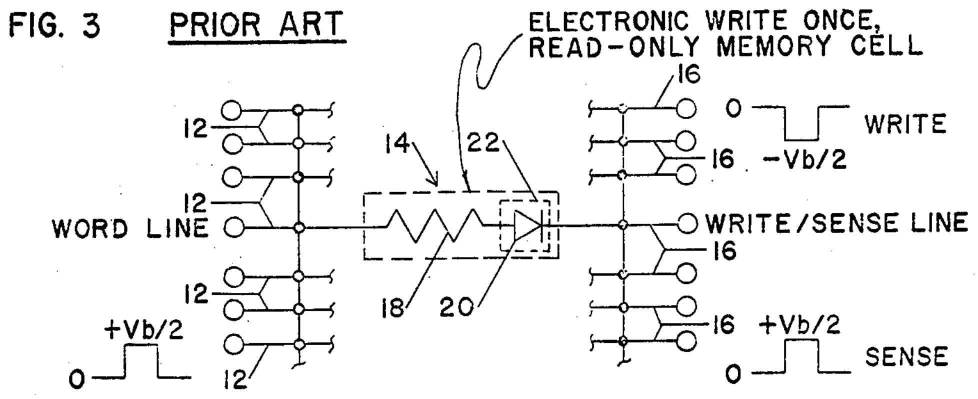
FIG. 3 PRIOR ART
FIG. 3 is a schematic representation, in more detail, of one type of prior art write once/read only memory array illustrated more generally in FIG. 1.
Figure 3A:
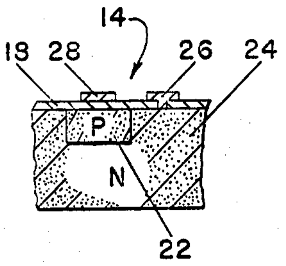
FIGS. 3A, 3B and 3C are detailed views before and after breakdown of the prior art memory cell of FIG. 3.
Figure 3B:
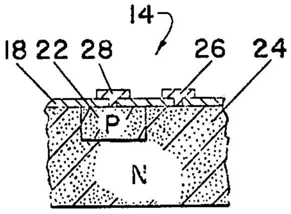
Figure 3C:
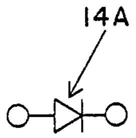
Figure 4:
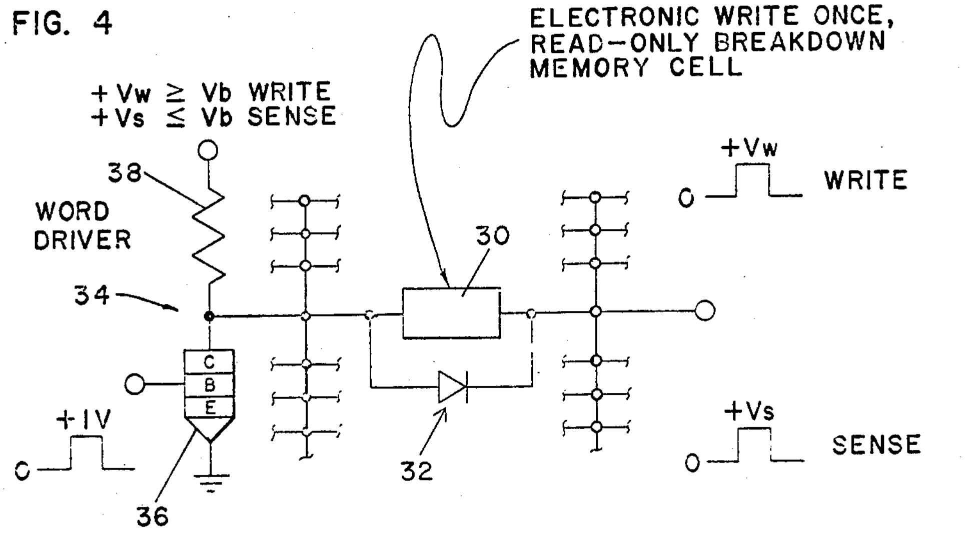
FIG. 4 is a schematic representation, in more detail, of the memory array of FIG. 2.

Referring to FIGS. 2 and 4, an improved write-once, read-only memory array is shown which comprises write once/read only breakdown types of memory cells 30 which can be of the kind described in either the copending patent application or the Electronics article or even other types of breakdown memory cells. A diode 32 is connected in parallel to each memory cell 30 which serves to prevent accidental writing of the cell because of the shunt function of the diode 32 for the memory cell 30. The diode 32 thus provides a low impedance shunt path for leakage currents and hence, an unselected memory cell is not required to carry current during, for example, the write operation.

The memory array of FIGS. 2 and 4 also comprises word drivers 34 which are part of the word lines. As shown in FIG. 4., where only one word driver 34 is shown in detail for a single memory cell 30, the word driver 34 comprises a transistor 36, preferably of the NPN type, connected between ground and a resistor 38. Hence, the emitter of the transistor 36 is directly connected to ground and the collector of the transistor 36 is connected to the resistor 38. A voltage source (of 1 volt, for example), is connected to the base of the transistor 36 to turn it on. The other end of the resistor 38 is connected to a voltage source which applies a voltage of $+V_w$ to the resistor during a write operation. The write voltage of $+V_w$ is greater than or at least equal to (in the case of a small resistance) the breakdown voltage $V_b$ so that the memory cell 30 can be changed from one electrical state to another different electrical state.

Write Operation

In writing into a memory cell 30 of FIGS. 2 or 4, the desired word driver 34 is electronically selected and base current is applied to the selected word drive transistor 36. All other word drive transistors are held in the OFF state by not applying a voltage to the base of these transistors. A voltage $+V_w$ which is greater than or equal to the breakdown voltage $V_b$ necessary to break down the memory cell 30 is applied to the resistor 38 which is electrically connected to the collector of the word drive transistor 36. The write (or bit)/sense lines are at ground potential. By selectively raising the potential of the sense line where a "1" or short circuit is desired, a +Vb breakdown voltage is applied across the selected memory cell 30 while all the other (non-selected) memory cells of the memory array have only a very low voltage applied thereto. This single pulse, write operation causes breakdown of the memory cell 30, thereby transferring memory cell 30 into a conducting state (single diode) from the previous non-conducting state (back-to-back diode or resistor-diode). After the write operation, the $+V_w$ applied to the resistor 38 is removed and the memory array is ready for the next write operation which is initiated by selecting the next address and repeating the write sequence.

Read Operation

Reading out of the memory array of FIGS. 2 or 4 is accomplished by applying a suitable sense voltage $V_s$ (about 4 volts, for example) to the resistor 38 of each word driver 34. The sense voltage $V_s$ is sensed on those write (or bit)/sense lines that are connected to memory cells 30 which have been transformed into a conducting state by means of a previous write operation. Those memory cells 30 that are in a non-conducting (non-written) state will not conduct any current and hence, nothing will appear on the associated write/sense line. A "1" or "0" indication can be used, as desired, to indicate the absence or presence of sense current on the write/sense line.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A memory array comprising, in combination, a plurality of semiconductor memory cells interconnected to provide a memory array, each of said cells having a first electrical state prior to receiving a writing voltage signal and an irreversible different second electrical state after receiving a writing voltage signal;

writing means electrically connected to said cells of said memory array for applying balancing write voltage signals to each end of said cells, each of said write voltage signals applied to the ends of said cells being at least equal to the voltage signal needed to place one of said memory cells into said second electrical state, said writing means comprises word driver means for changing the voltage signal applied to one end of selected memory cells and for causing a write voltage signal to be applied to the other end of selected memory cells and placing said selected memory cells in said second electrical state, reading means for sensing the information contained in said memory array, and protection means for preventing unselected memory cells from being accidentally placed into said second electrical state, said protection means comprises a diode connected in parallel to each of said memory cells.

2. A memory array in accordance with claim 1 wherein said writing means comprises word driver means for applying said write signal to only one end of said selected memory cell, said word driver means comprises a transistor, said word driver means further comprises a resistor connected to the collector of said transistor and connectable to a first voltage source whose value is sufficient to place said selected memory cell in said second electrical state, the base of said transistor being connectable to a second voltage source capable of turning on said transistor, and the emitter of said transistor being connected to ground, said one end of said selected memory cell being connected between said resistor and the collector of said transistor of said word driver means.

* * * * *